United States Patent
Grayson

(10) Patent No.: US 12,441,627 B1
(45) Date of Patent: Oct. 14, 2025

(54) WATER FILTERING DEVICES AND METHODS OF USING THE SAME

(71) Applicant: Matthew Grayson, Big Spring, TX (US)

(72) Inventor: Matthew Grayson, Big Spring, TX (US)

(73) Assignee: Matthew Grayson, Big Spring, TX (US)

( * ) Notice: Subject to any disclaimer, the term of this patent is extended or adjusted under 35 U.S.C. 154(b) by 0 days.

(21) Appl. No.: 19/040,213

(22) Filed: Jan. 29, 2025

Related U.S. Application Data

(60) Provisional application No. 63/549,155, filed on Feb. 2, 2024.

(51) Int. Cl.
 *C02F 1/00* (2023.01)

(52) U.S. Cl.
 CPC ........ *C02F 1/002* (2013.01); *C02F 2201/004* (2013.01); *C02F 2201/006* (2013.01); *C02F 2307/02* (2013.01)

(58) Field of Classification Search
 CPC ............................ C01D 1/002; C01D 2307/02
 See application file for complete search history.

(56) References Cited

U.S. PATENT DOCUMENTS

| | | | | |
|---|---|---|---|---|
| 4,035,150 | A | * | 7/1977 | Jaffe ..................... G01N 33/726 436/66 |
| 4,151,092 | A | * | 4/1979 | Grimm .................... C02F 1/003 210/256 |
| 8,790,511 | B2 | * | 7/2014 | Yang ....................... C02F 1/002 210/85 |
| 10,710,007 | B2 | | 7/2020 | Weston et al. |
| 11,179,657 | B2 | | 11/2021 | Weston et al. |
| 11,944,921 | B2 | | 4/2024 | Weston et al. |
| 12,097,450 | B2 | | 9/2024 | Weston et al. |
| 12,161,958 | B2 | | 12/2024 | Weston et al. |

* cited by examiner

*Primary Examiner* — Benjamin M Kurtz
(74) *Attorney, Agent, or Firm* — Foley IP Law, PLLC

(57) ABSTRACT

A liquid filtration device that includes a cup assembly configured to carry an unfiltered liquid. The cup assembly includes a cup body for receiving the unfiltered liquid and a cup base configured to be removably coupled with the bottom end of the cup body. The liquid filtration device further includes a bottle assembly configured to be plunged into the top of the cup assembly in a plunging direction and seated within the cup assembly when fully plunged. The bottle assembly includes a port configured to be coupled with a filter cartridge and communicate the unfiltered liquid carried by the cup assembly through the filter cartridge to an interior of the bottle assembly. To extract the bottle assembly from the cup assembly, the cup base is uncoupled from the cup body and the bottle assembly is moved in the plunging direction past the bottom end of the cup body.

15 Claims, 10 Drawing Sheets

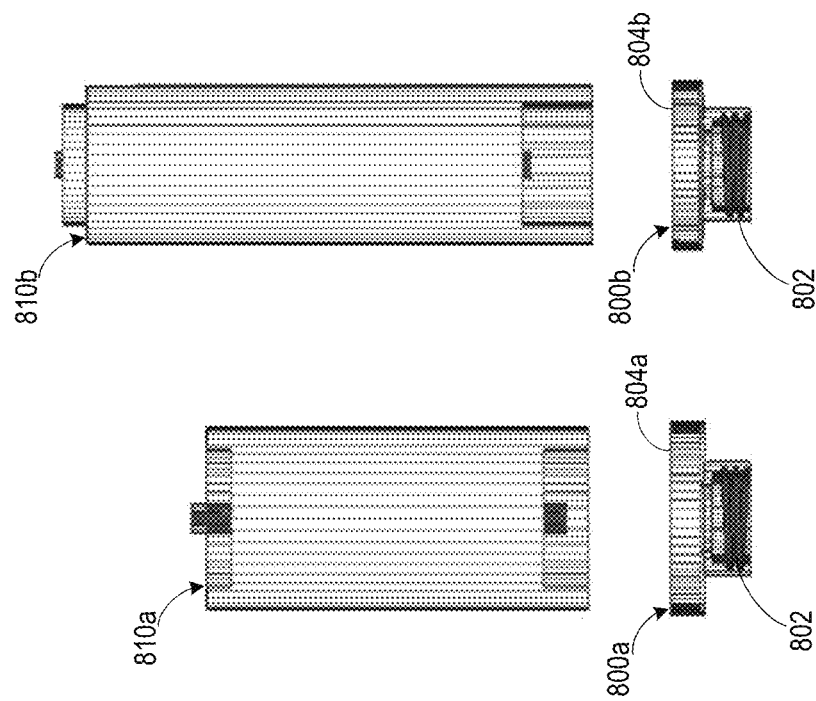
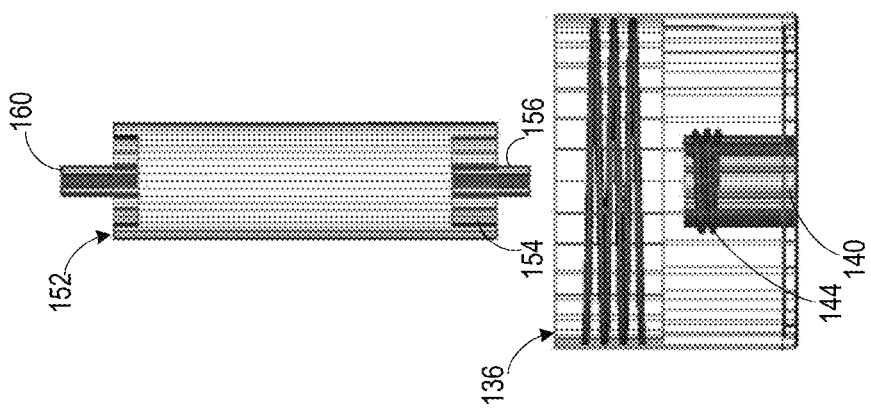
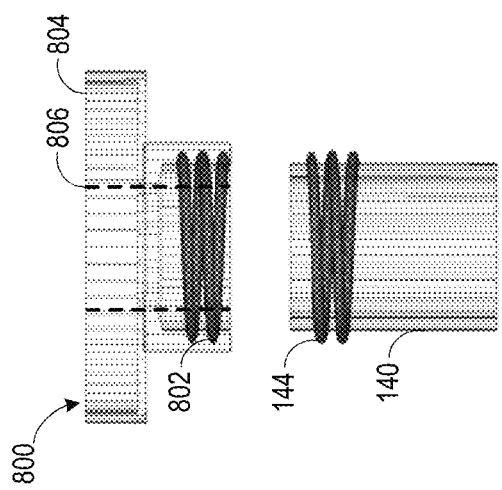
FIG. 8A
FIG. 8B

WATER FILTERING DEVICES AND METHODS OF USING THE SAME

CLAIM OF PRIORITY TO PRIOR APPLICATION

This application claims priority to U.S. Provisional Patent Application No. 63/549,155, filed on Feb. 2, 2024, the entire disclosure of which is incorporated herein by reference.

FIELD OF THE INVENTION

The present invention relates generally to water filtering devices, and specifically to portable devices configured to filter natural water for human consumption.

BACKGROUND OF THE INVENTION

Portable and non-portable water filtering devices powered by mechanical energy are used in various scenarios where access to industrial or otherwise established water filtering systems are not accessible, including scenarios such as international traveling, camping, backpacking, hiking, and other exploratory ventures. For some of these traditional water filtering devices, in order to filter a substantial amount of natural water in a relatively-short amount of time, the devices require the user to exert a large amount of force in order to press the natural water through a filtering component of the system. In fact, the amount of force required by these systems can be so large that it often limits who is capable of using the device. For example, many of the devices are not operable by various people groups, such as the elderly, children, those with physical disabilities or impairments, or those suffering from a physical injury to one of their limbs. For example, some traditional systems require an able-bodied adult to use both of their hands in order to exert enough force needed to pass the unfiltered water through the filtering component.

BRIEF SUMMARY OF THE INVENTION

The disclosed examples are described in detail below with reference to the accompanying drawing figures listed below. The following summary is provided to illustrate some examples disclosed herein.

According to various embodiments of this disclosure, disclosed is a water filtering device. The device includes an outer cup with a generally cylindrical body configured to be used to collect natural water. The device further includes an inner bottle with a cylindrical body configured to be seated within the outer cup. Specifically, the inner bottle comprises a sealing feature disposed on an outside of the bottle's cylindrical body configured to seal against an inner surface of the cylindrical body of the outer cup when the inner bottle is disposed within the outer cup. The inner bottle further comprises a filter cartridge connection point disposed on a base of the inner bottle and to which a water filter cartridge is configured to be coupled. The device further includes a mechanically energized component configured to couple the inner bottle with the outer cup and bias, or be used to force, the inner bottle to a fully-seated position within the outer cup.

Thus, in use, a user first fills the outer cup with natural water. Then the user aligns the base of the inner bottle with an opening of the cup. The user then positions the energized component to press the inner bottle within the outer cup. As the energized component presses and plunges the inner bottle, and due to the seal between the outer wall of the bottle and the inner wall of the cup, natural water from the cup is forced up through the filtering cartridge coupled to the cartridge connection point. Thus, filtered water is discharged from the filtering cartridge into the interior of the inner bottle. When the inner bottle is fully seated in the outer cup, all of the natural water originally carried by the outer cup is filtered by the filtering component and is held within the inner bottle for a user to safely drink.

BRIEF DESCRIPTION OF THE DRAWINGS

FIGS. 8A and 8B illustrate a filter adapter configured to adapt water filtering devices of this disclosure to be used with various filtration cartridges.

DETAILED DESCRIPTION OF THE INVENTION

Figure 1:
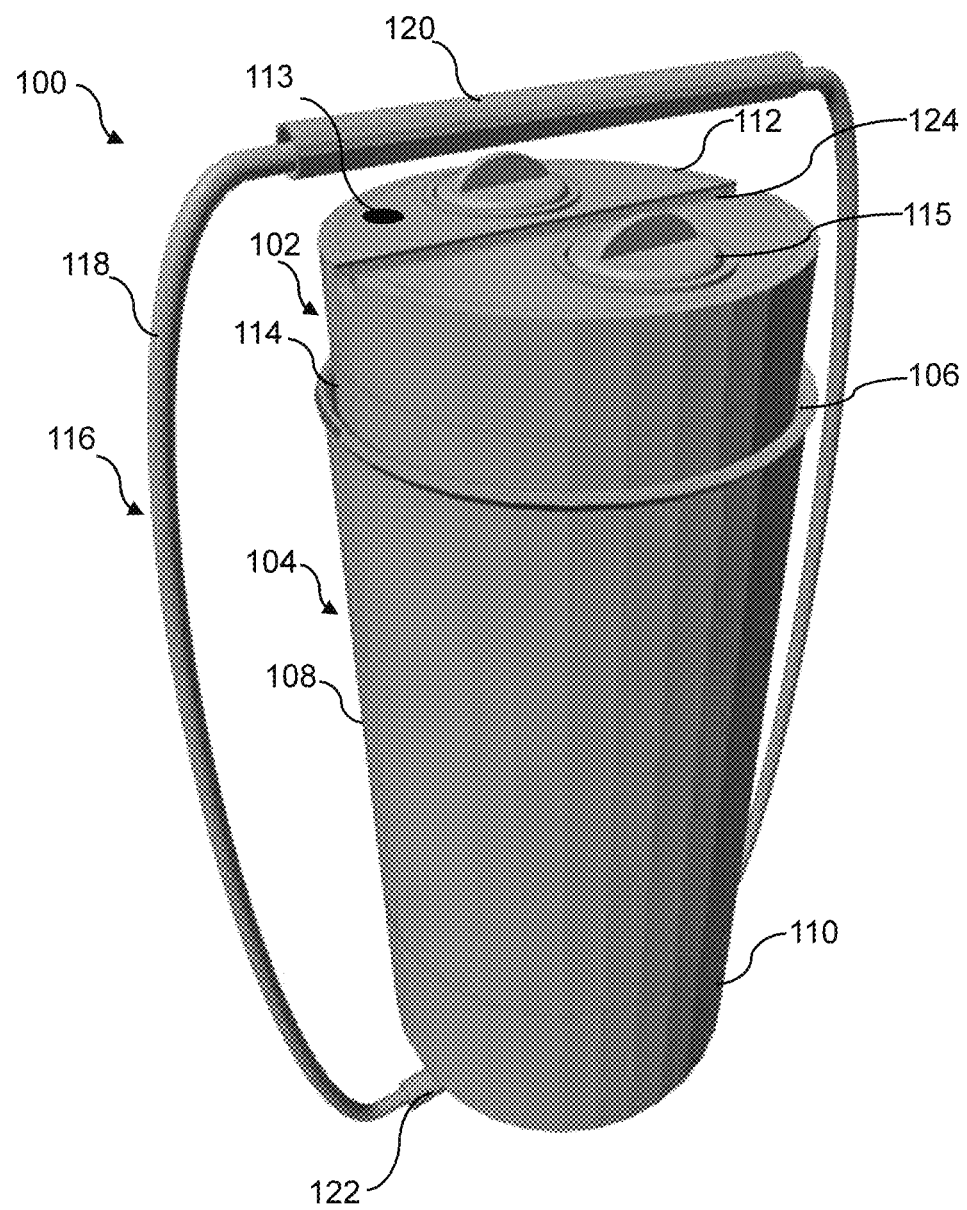
FIG. 1 illustrates a top perspective view of a water filtering device, according to an embodiment of this disclosure.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some embodiments, . . . " For brevity and clarity of presentation, this implied leading clause is not repeated ad nauseum.

Those involved with international travel, camping, backpacking, hiking, and other exploratory ventures are all too familiar with a common problem: reliable access to safe drinking water. This problem has traditionally been addressed by a number of different methods, including packing or procuring bottled-water or filtering water found on the exploratory venture, such as water from rivers, streams, creeks, ponds, lakes, or wells, for example (herein, such water may be referred to as "natural water" or "unfiltered water").

Of course, the disadvantages associated with using bottled-water are familiar. Transporting enough bottled-water is heavy and often unfeasible; and relying on being able to find places to procure bottled-water on these types of exploratory ventures is often unwise. Additionally, there are undesirable environmental impacts associated with using these single-use plastic containers.

While there are existing water-filtering devices and systems for filtering natural water, these traditional devices are not without their own drawbacks. For example, for some traditional water filtering devices, in order to filter a substantial amount of natural water in a relatively-short amount of time, the devices require the user to exert a large amount of force in order to press the natural water through a filtering component of the system. In fact, the amount of force required by these systems can be so large that it often time limits who is capable of even using the device. For example, many of the devices are not operable by various people groups, such as the elderly, children, those with physical disabilities or impairments, or those suffering from a physical injury to one of their limbs. For example, some traditional systems require an able-bodied adult to use both of their hands in order to exert enough force needed to pass the natural water through the filtering component. In certain emergency situations, a hiker, for example, may severely injure one of their hands such that using one of these traditional systems is impossible. In addition to exploratory ventures, access to large quantities of safe drinking water is a well-known issue in various developing countries around the world. Finally, many traditional filtration devices are only compatible with a particular filter cartridge associated with the given filtration device, thus leading to rigid compatibly constraints and limiting a user's options in procuring compatible filter cartridges.

Accordingly, there has been a long-felt need for a water-filtering system able to filter a substantial amount of natural water in a relatively-short amount of time with little to no exertive force required by the user.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 2:
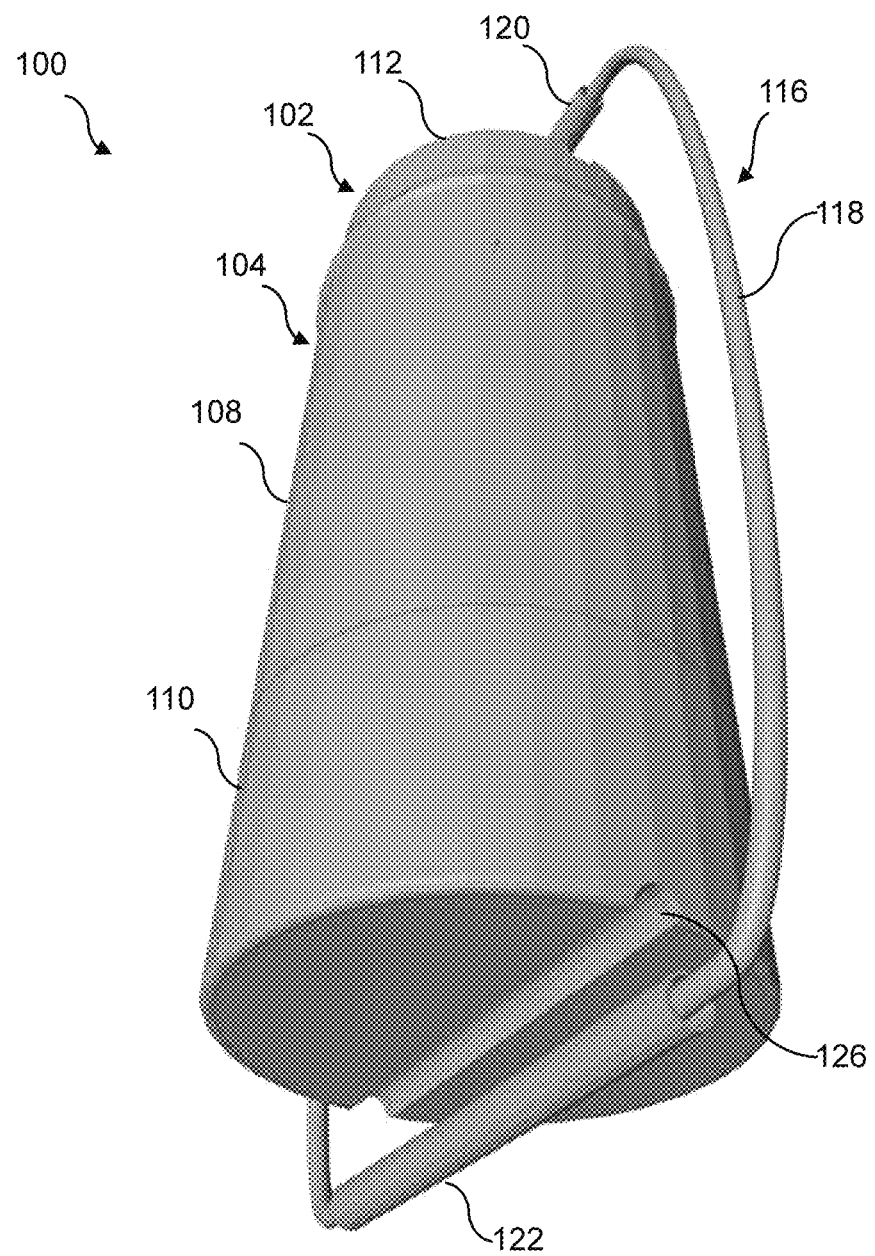
FIG. 2 illustrates a bottom perspective view of the water filtering device of FIG. 1.

FIGS. 1 and 2 illustrate top and bottom perspective views, respectively, of a water filtering device 100. Device 100 includes an inner bottle 102 disposed within an outer cup 104. Specifically, cup 104 includes an open mouth 106 in which bottle 102 is configured to be inserted and fully seated within cup 104. As will be discussed in greater detail below, FIGS. 1 and 2 illustrate bottle 102 in a fully seated position within cup 104 such that outer surface of a base of bottle 102 is in contact with an inner surface of a base of cup 104. Both bottle 102 and cup 104 may herein be referred to as a container. As shown, according to various embodiments, bottle 102 and cup 104 are generally cylindrically-shaped.

As will be discussed in greater detail below, cup 104 includes a main body 108, where a top end of body 108 forms mouth 106. Coupled with a bottom end of body 108 is a removably coupled base 110. Base 110 is coupled with body 108 to create a fluid-tight seal to prevent fluid from escaping at the junction point between body 108 and base 110. According to various embodiments, and as shown in greater detail later, base 110 has a threaded connection with body 108. As will be discussed in greater detail below, bottle 102 comprises a removably coupled lid 112 coupled with a top end of a body 114 of bottle 102. Lid 112 is coupled with body 114 to create a fluid-tight seal to prevent fluid from escaping at the junction point between body 114 and lid 112. According to various embodiments, and as shown in greater detail later, lid 112 has a threaded connection with body 114. Lid 112 further comprises two compartment caps 115 coupled with lid 112 and within which water enhancement tablet (such as for flavor or electrolyte enhancers) or water cleaning tablets can be stored. The compartment caps 115 can be coupled with lid by any of a number of commonly used connection mechanisms, such as by threaded connection, friction-fit, or snap-fit with a lip that creates friction with the mating walls of the lid 112. Lid 112 further comprises a vent 113 configured to communicate air between the interior volume of the bottle 102 and the atmosphere. As will be discussed in greater detail below, vent 113 is configured to allow air within bottle 102 that is displaced by filtered water to be discharged from bottle 102 to the atmosphere.

In addition to bottle 102 being insertably coupled with cup 104, in some embodiments, bottle 102 is further coupled with cup 104 by an elastic band assembly 116. Band assembly 116 comprises a ring-shaped elastic band 118 and two stiff handles 120, 122. Band 118 is illustrated as slightly extended or stretched above lid 112 so that features of lid 112 can be easily seen. However, handle 120 is configured to be seated in a handle groove 124 of lid 112 and, similarly, handle 122 is configured to be seated in a handle groove 126 of base 110. In some embodiment, handles 120 and 122 are identical, and thus assembly 116 can be used with each handle being used with either of base 110 or lid 112. Band 118 can be made from any of a number of materials typically used for such bands, such as, for example, rubber, latex, or elastic fabric, and can be in the form of a band, chord, or tube, for example. Handles 120, 122 can be made from an of a number of plastics or metals, and in some cases can be made from the same material as lid 112 and base 110. While handles 120, 122 and handle grooves 124, 126 are illustrated as generally cylindrical in shape, those with skill in the art will understand that various other shapes fall within the scope of this disclosure. For example, in some embodiments, handles 120, 122 and handle grooves 124, 126 are generally spherical or rectangular in shape.

As will be discussed in greater detail below, in use, natural water is configured to be collected within cup 104. A user then inserts bottle 102 into mouth 106 and extends elastic band assembly 116 into place within grooves 124, 126. Elastic band 118 is configured to bias bottle 102 to the fully seated position within cup 104. While moving toward the fully seated position, a filtering device or cartridge disposed within bottle 102 filters water entering bottle 102 from cup 104 by an entrance port of the bottle 102. Accordingly, when forced into the fully seated position by band assembly 116, all, or substantially all, the natural water originally held in cup 104 has been filtered and is disposed within bottle 102. Those with skill in the art will recognize that elastic band assembly 116 is just one of various mechanically-charged plunging-assist devices that could be used to assist in plunging bottle 102 into cup 104. Further, according to various embodiments, plunging-assist devices that are electrically-, nematically-, or gravity-powered are used in plunging bottle 102 within cup 104.

Figure 3:
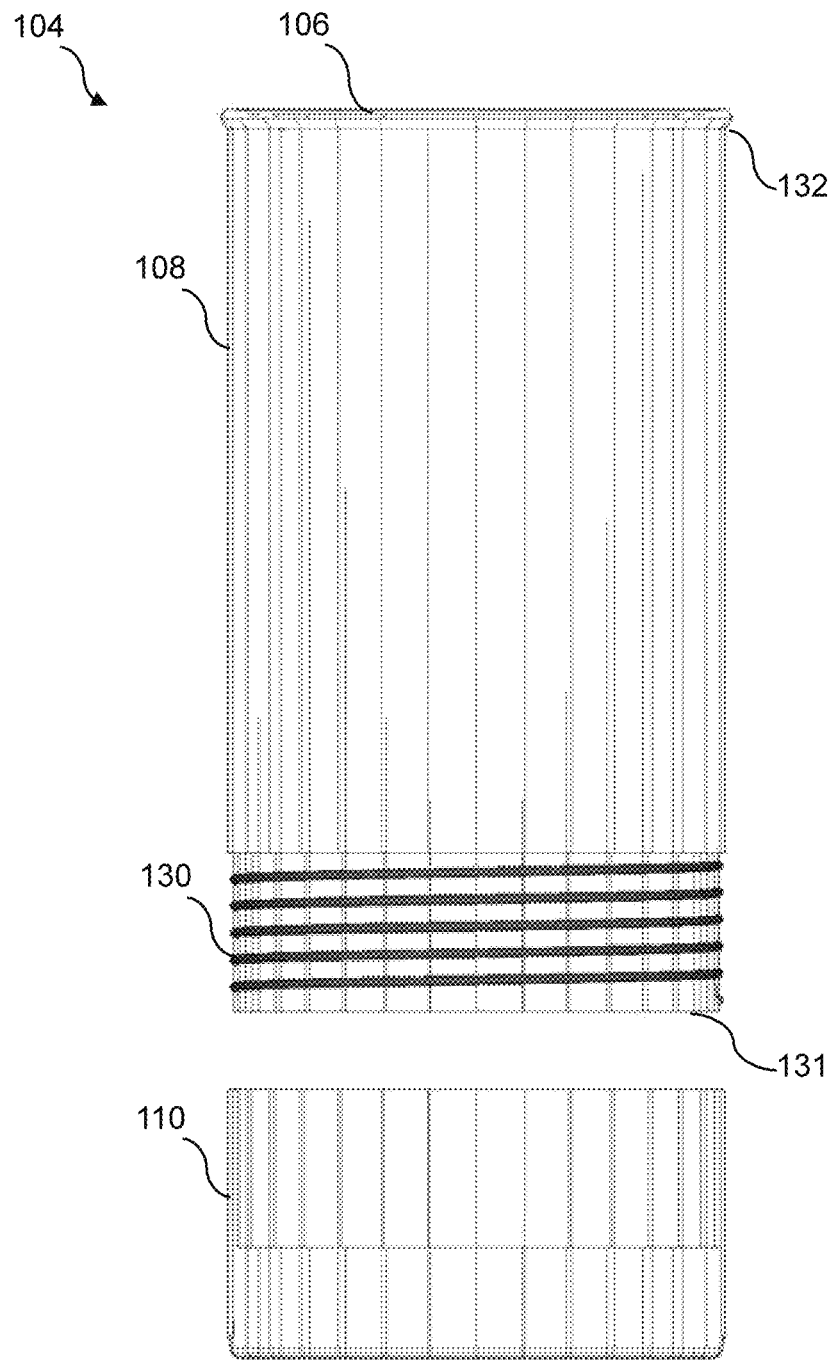
FIG. 3 illustrates an exploded side view of an outer cup of the water filtering device of FIG. 1.

FIG. 3 illustrates an exploded side view of outer cup 104. Base 110 has internal threads for coupling with threaded section 130 body 108 disposed adjacent to a bottom opening 131 of body 108. As previously discussed, the connection between base 110 and body 108 is water-tight such that water is prevented from leaking through threaded section 130 when device 100 is in use. Mouth 106 comprises a beveled outer end 132 configured to facilitate and funnel entry of bottle 102. According to various embodiments, base 110 and body 108 are made from a hard plastic, such as for example high-density polyethylene (HDPE) or a similar plastic. According to various embodiments, base 110 and body 108 are made from a metallic material, such as for example steel, aluminum, copper or copper alloys, or similar metals.

Figure 4:
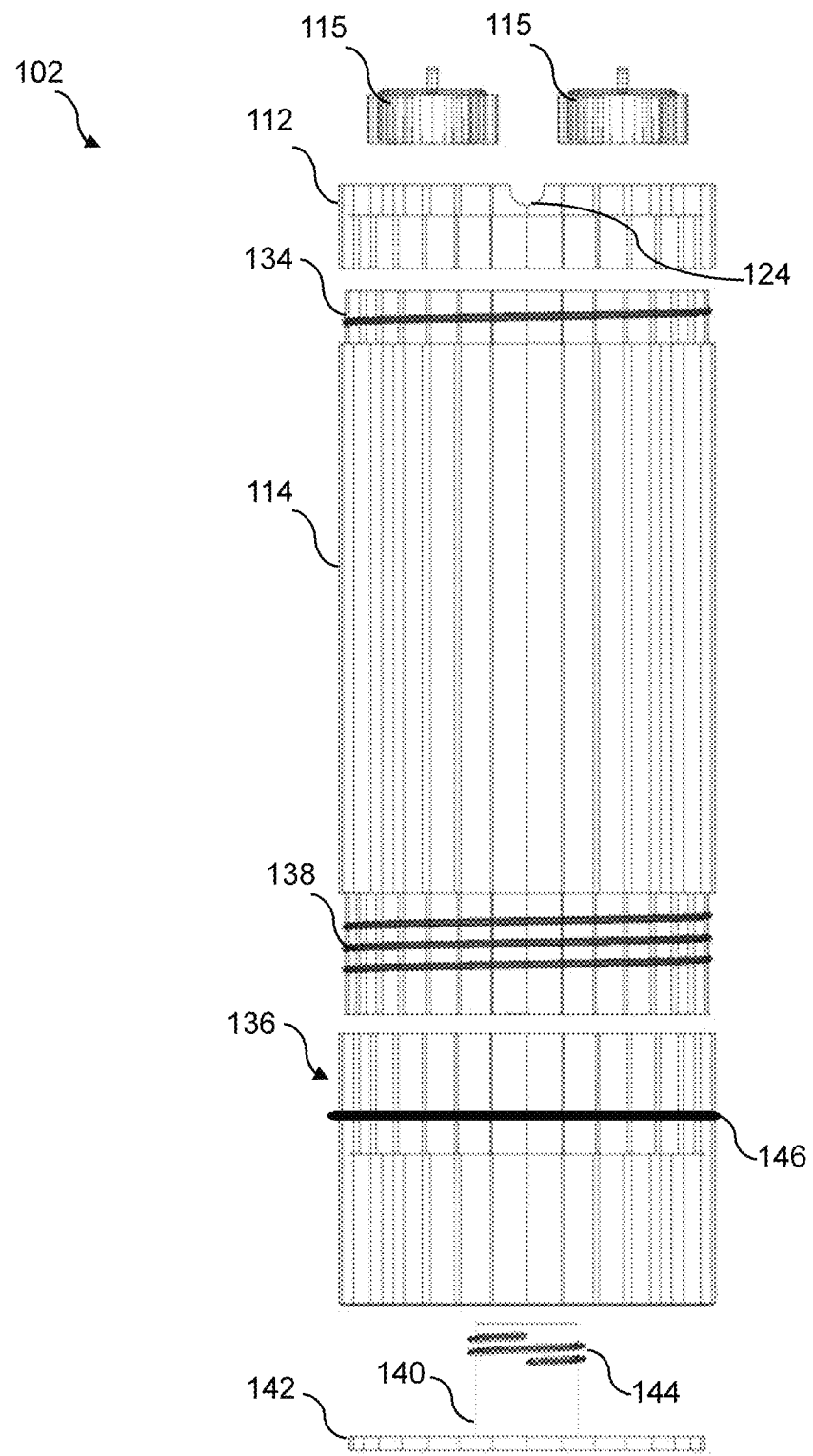
FIG. 4 illustrates an exploded side view of an inner bottle of the water filtering device of FIG. 1.

FIG. 4 illustrates an exploded side view of inner bottle 102. Lid 112 comprises internal threads for coupling with top threaded section 134 of body 114. As previously discussed, this threaded connection is water-tight such that water is prevented from leaking through threaded section 134 when device 100 is in use. Bottle 102 further comprises a base 136 with internal threads configured to be coupled with a bottom threaded section 138 of body 114. This threaded connection is water-tight such that water is prevented from leaking through threaded section 138 when device 100 is in use. According to various embodiments, base 136, body 114, and lid 112 are made from a hard plastic, such as for example high-density polyethylene (HDPE) or a similar plastic. According to various embodiments, base 136, body 114, and lid 112 are made from a metallic material, such as for example steel, aluminum, copper or copper alloys, or similar metals. Throughout this description, lid 112 may be referred to as a bottle top cap, base 136 may be referred to as a bottle bottom cap, and bottle body 108 may be referred to as a bottle center core.

Base 136 includes an inlet port 140 through which water is configured to communicate between cup 104 and bottle 102. As shown, port 140 has a generally cylindrical shape and extends up from a bottom wall 142 of base 136. Bottom wall 142 is integrally formed with the cylindrical body of base 136, but is illustrated as being separate in this exploded view for explanatory purposes. Port 140 comprises a distal end with a threaded section 144 configured to be coupled with a water filtering cartridge. As will be discussed in greater detail below, according to various embodiments of this disclosure, various water filtering cartridges known in the art can be used with device 100. Here, filtering cartridges are shown as being connected to port 140 using threaded section 144, but those with skill in the art will understand that various connection types other than threads can be used to couple port 140 with a filtering cartridge depending on the corresponding matting connection point of the filtering cartridge. Accordingly, threaded section 144 can also be referred to herein as a filter-attachment-section of port 140.

Base 136 further comprises a seal 146 configured to form a water- or air-tight seal against a smooth inner surface of cup body 108 and/or cup base 110 when bottle 102 is disposed within cup 104. According to various embodiments, seal 146 is an O-ring or other rubber gasket/seal seated in a groove of base 136. According to various embodiments, seal 146 is a plastic hump or lip made of HDPE or similar plastic and configured to elastically deform and seal against the inner wall of body 108, and in some embodiments can be integrally formed with base 136. According to various embodiments, seal 146 is disposed on bottle body 114. According to various embodiments, seal 146 is disposed on an inner wall of cup body 108 and/or base 110 and is configured to seal against an outer wall of base 136 or body 114. According to various embodiments, there are a plurality of the seal 146 described herein. As will be discussed in greater detail below, seal 146 is configured to create a seal between the outside walls of bottle 102 and the inner walls of cup body 108 so that when bottle 102 is plunged into cup 104 for filtering natural water held by cup 104, the natural water is directed to port 140 for filtering and is prevented from escaping from the gap between the outer walls of bottle 102 and the inner walls of cup 104.

Figure 5:
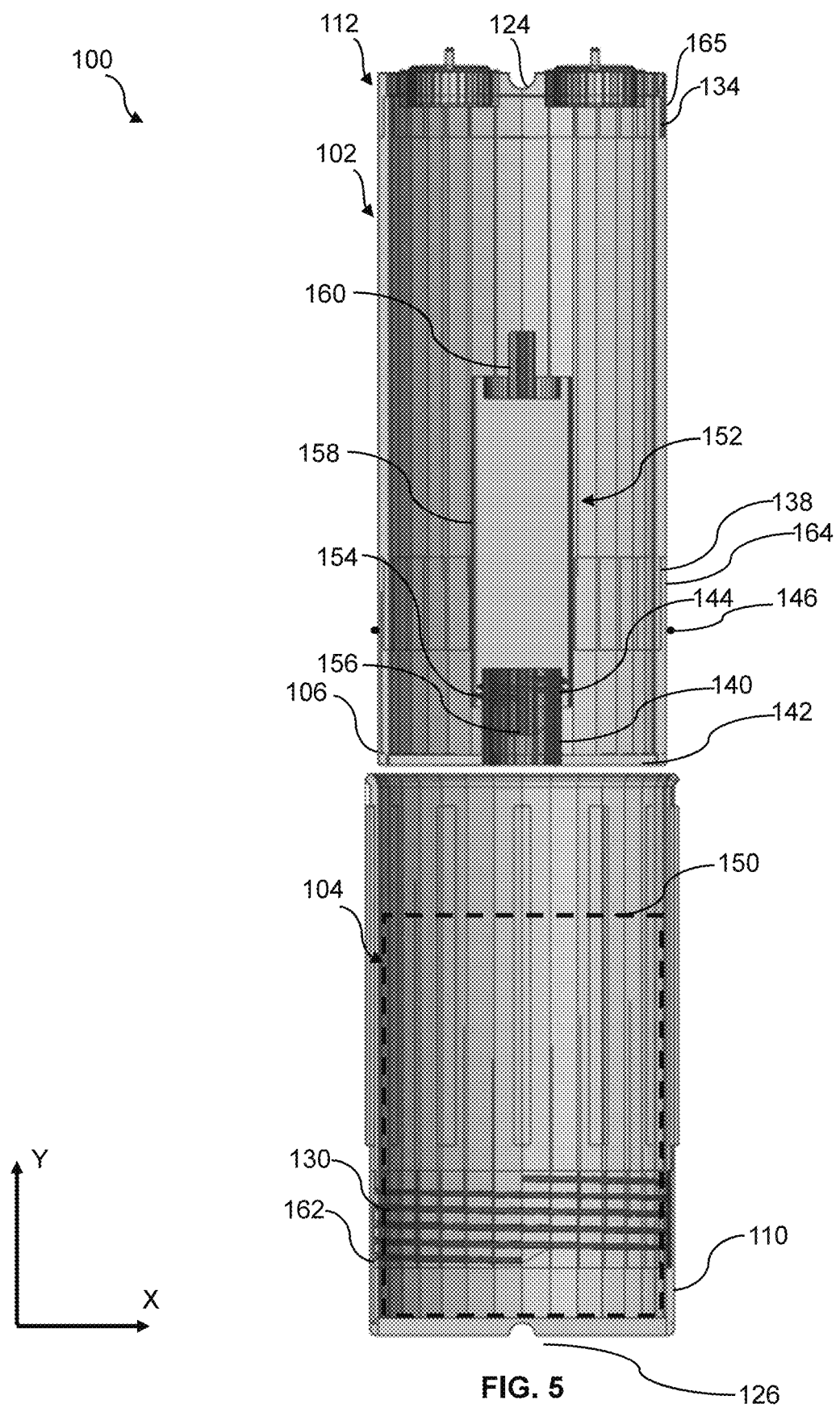
FIG. 5 illustrates a side cut view of the water filtering device of FIG. 1 positioned with the inner bottle in an unseated position.

FIG. 5 is a cut view of water filtering device 100 showing bottle 102 just before its insertion into the mouth 106 of cup 104 in the −y direction, and can thus be said to be in an unseated position. As can be seen, in use, cup 104 is configured to carry a volume of natural or un-filtered water, the volume water being represented by the dashed-line box 150. FIG. 5 also illustrates a filtering cartridge 152 configured to filter the natural water 150. Those with skill in the art will understand that filtering cartridge 152 can be any of a number of various known filtering cartridges. In some embodiments, a SP128 Mini Water Filter made by Sawyer or a similar filter is used as filter cartridge 152. In some embodiments, a LifeStraw Personal Water filter or a similar filter is used as filter cartridge 152. In some embodiments, a Camco TastePURE Camper/RV water filter or a similar filter is used as filter cartridge 152.

Cartridge 152 has a coupling element 154 configured to couple an inlet 156 of the cartridge with port 140. In this embodiment, the coupling element 154 is internally-facing threads configured to be coupled with threaded section 144 of port 140. Those with skill in the art will understand that adaptors for fitting the inlet of various filter cartridges with port 140 are within the scope of this disclosure, as will be discussed in greater detail below. Inlet 156 is configured to receive natural water from port 140 and deliver water to a filtering element 158 or multiple filtering elements of the filter cartridge 152. After passing through the filtering element 158, the processed water is configured to be discharged from outlet 160 and pool within the interior volume of bottle 102, as will be discussed in greater detail below.

Also shown in FIG. 5 is how cup base 110 has an internal threaded section 162 configured to be coupled with the bottom threaded section 130 of cup body 108. Additionally, FIG. 5 shows how bottle base 136 has an internal threaded section 164 configured to be coupled with the bottom threaded section 138 of bottle body 114. Finally, FIG. 5 shows how bottle lid 112 has an internal threaded section 165 configured to be coupled with the bottom threaded section 134 of bottle body 114.

Figure 6:
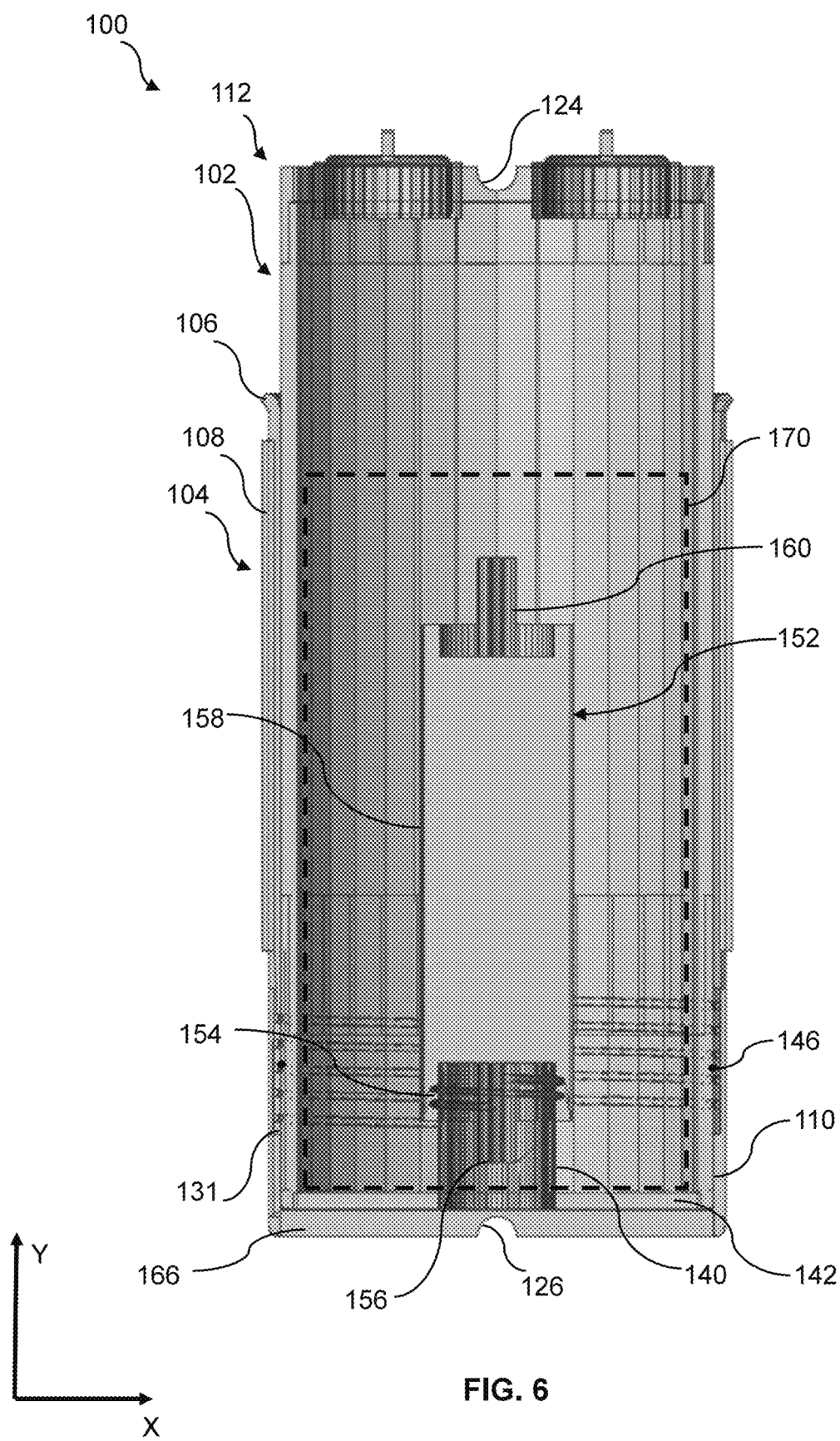
FIG. 6 illustrates a side cut view of the water filtering device of FIG. 1 positioned with the inner bottle in a fully-seated position.

FIG. 6 illustrates a cut view of device 100 with bottle 102 being fully seated in cup 104 such that an outer surface of bottom wall 142 of bottle base 136 contacts an inner surface of a bottom wall 166 of cup base 110. Specifically, FIG. 6 illustrates after bottle 102 has been plunged fully within cup 104 in the −y direction to filter natural water 150 and to form a volume of filtered water 170 held within bottle 102. Specifically, as bottle 102 is plunged from the unseated position in FIG. 5 to the fully seated position in FIG. 6, natural water 150 held by outer cup 104 (as shown in FIG. 5) is forced into inlet port 140 by being displaced by bottle 102. Those with skill in the art will recognize that natural water 150 has nowhere but port 140 to travel to as the plunging force is be applied to bottle 102, as seal 146 prevents the only other possible flow path for water 150 displaced by bottle 102 to travel, which would be to travel upward in the gap between the inner walls of cup 104 and the outer walls of bottle 102. Accordingly, as water 150 is displaced by the plunging travel of bottle 102, it is forced to port 140 and into filter cartridge 152 at inlet 156. After entering inlet 156, the water is forced past the filtering elements 158 and discharged from outlet 160 as filtered water 170. Air held by bottle 102 that is displaced by filtered water 170 in discharge from bottle 102 by vent 113. Thus, in the fully seated position shown in FIG. 6, all or substantially all of the natural water is filtered by filter cartridge 152 and available to a user within bottle 102 as filtered water. As will be discussed in greater detail below, after bottle 102 is fully seated and filtered water 170 is formed, a user can uncouple cup base 110 from cup body 108 (via the threaded coupling) and continue pushing bottle 102 in the −y direction to expel the bottle 102 from the bottom opening 131 of cup body 108 to dislodge the bottle 102 from body 108. At which point, bottle lid 112 can be uncoupled from bottle body 114 and the filtered water 170 can be accessed by the user.

Figure 7:
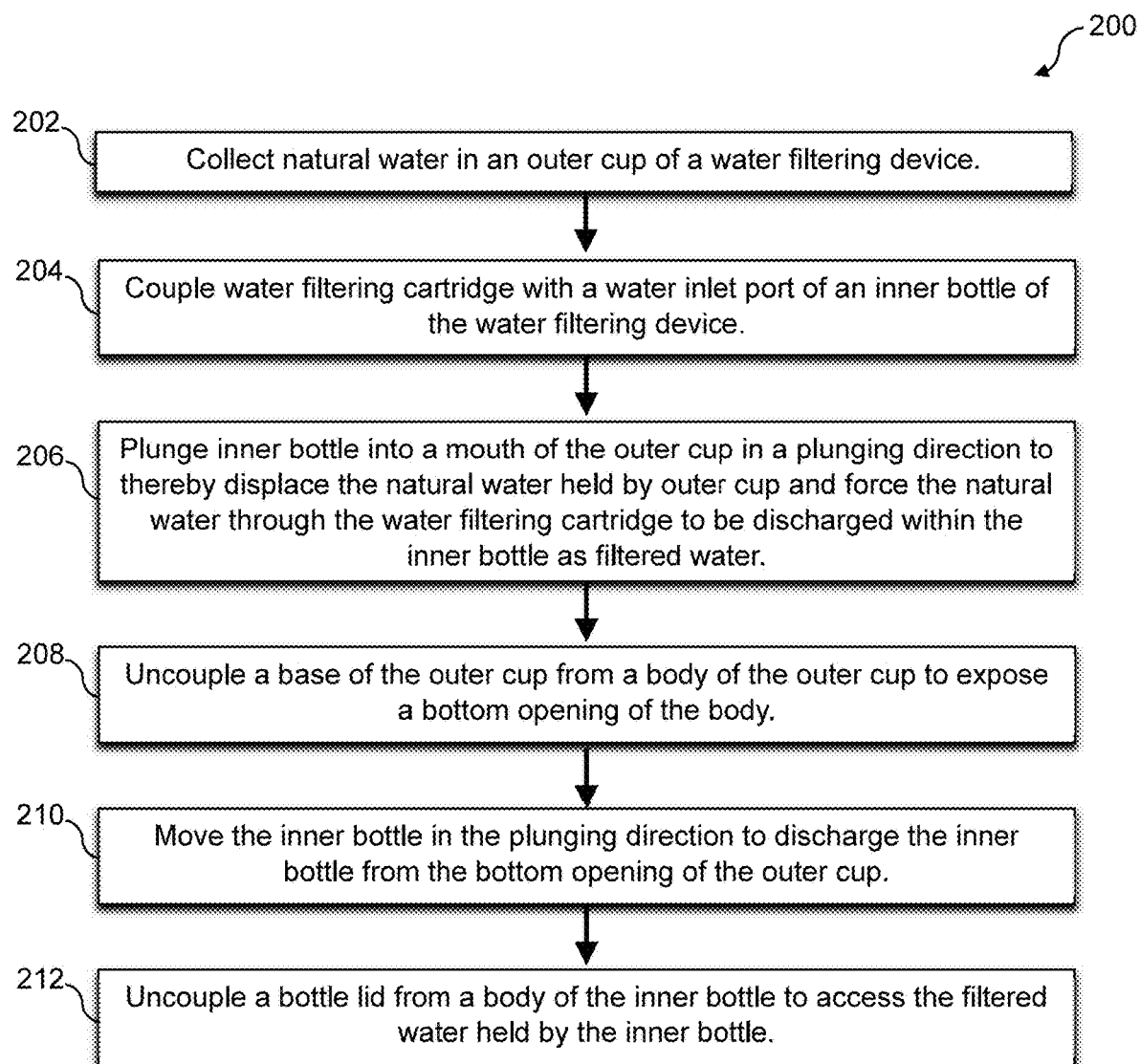
FIG. 7 is a flowchart illustrating a method for filtering water with a water filtering device, according to an embodiment of this disclosure.

FIG. 7 is a flowchart illustrating a method 200 for filtering water, such as by using device 100. Method 200 can start at block 202 by collecting od disposing natural or otherwise unfiltered water 150 within cup 104. For example, as has been discussed, this can include collecting water from a river, stream, brook, creek, pond, lake, well or other natural water supply, and can also include collecting unfiltered water from a domestic or international spout or tap. Method 200 can continue to block 204 by coupling filter cartridge 152 with bottle inlet port 140, as has been previously described. According to various embodiments, block 204 can further include disconnecting bottle base 136 from bottle body 114 to more-easily access port 140. For example, according to some embodiments, port 140 may not be accessible by human hand when base 136 is coupled with body 114. After cartridge 152 is coupled with port 140, base 136 can be reassembled with body 114. Method 200 can proceed to block 206 by plunging inner bottle 102 into cup 104 to fully seat bottle 102 within cup 104, thereby forcing natural water through filter cartridge 152. As has been previously discussed, and referencing FIGS. 5 and 6, this includes pushing bottle 102 in the −y direction to the fully seated position shown in FIG. 6, and, in the process, forcing natural water 150 though filter cartridge 152 and thereby discharging filtered water 170 into bottle 102.

According to various embodiments, optionally, elastic band assembly 116 can be used to perform or assist in performing block 206. Specifically, the user can set the bottom of the bottle 102 in the mouth 106 of cup 104, and the bottle may sit there due to resistive force between seal 146 and the inner wall of cup body 108. At this time, the user can seat handle 122 into bottom groove 126, stretch elastic member 118 such that handle 120 is disposed above lid 112, and then seat handle 120 in groove 124. By doing so, elastic band 118 is configured to exert a plunging force on bottle 102 in the −y direction that overcomes the resistive force of seal 146 and also the restive force against bottle 102 caused by natural water 150 traveling through filter cartridge 152, and thus band 118 can be described as being biased to force the bottle 102 to the fully seated position shown in FIG. 6. Elastic band 118 is configured to be energized to provide enough force to move bottle 102 from being unseated to being fully seated as shown in FIG. 6

Method 200 can continue to block 208 by uncoupling cup base 110 from cup body 108 by uncoupling threaded section 130 from threaded section 162 and thereby exposing the bottom opening 131 of cup body 108. Method 200 can continue to block 210 by the user continuing to push the bottle 102 in the −y direction through opening 131 until the bottle 102 is dislodged from cup body 108. In other embodiments, block 210 can include the user pulling the bottle 102 in the +y direction to pull bottle 102 from the cup mouth 106. The user may prefer to push or pull the bottle depending on the location of bottle seal 146, as seal 146 will provide resistive force against the pushing or pulling. In the embodiment shown, referring to FIG. 6, when bottle 102 is completely seated, seal 146 is much closer to opening 131 than mouth 106. Accordingly, the user would likely prefer to continue pushing bottle in the −y direction (the plunging direction) since there is much less of a resistive distance that seal 146 must travel. In embodiments where bottle 102 is pulled from mouth 106, cup base 110 can still be removed so as to not create vacuum effect with seal 146 when being pulled in the +y direction. However, in some embodiments, seal 146 is only configured to travel and seal against in cup body 108-y direction (the plunging direction) and, in those embodiments, base 110 is removed to allow seal 146 to continue to move in the −y direction so that bottle 102 can be dislodged from cup body 108.

Method 200 can continue to block 212 by uncoupling bottle lid 112 from bottle body 114, as has been previously discussed, to allow user to access filtered water 170 carried by bottle 102. Those with skill in the art will recognize that blocks 202-212 are shown in a certain order, but method 200 can be performed by performing blocks 202-212 in any of a number of orders, including performing certain blocks 202-212 simultaneously, without departing from the scope of this disclosure. Further, certain blocks 202-212 or steps can be added or removed from method 200 without departing from the scope of this disclosure.

FIG. 8A illustrates a partially-transparent view of a cartridge adapter 800 which can be included as part of device 100, according to various embodiments of this disclosure. As previously discussed, threaded section 144 of base 136 may be a specific thread-type and size specific to a certain filter cartridge, such as filter cartridge 152, and may not be compatible with other filter cartridge types that a user desires to use with device 100. In such cases, the user can utilize cartridge adapter 800 to adapt device 100 to be compatible with a desired cartridge. As shown, cartridge adapter 800 includes a threaded section 802 at the bottom of cartridge adapter 800, sized to be threadably coupled with threaded section 144. At the top of cartridge adapter 800 there is a cartridge mating section 804 configured to be mated with a desired filter cartridge. That is, depending on the desired filter cartridge with which cartridge adapter 800 is configured to be compatible, cartridge mating section 804 comprises coupling elements for coupling cartridge adapter 800 with an inlet end of the filter cartridge. Thus, when both threaded section 802 and cartridge mating section 804 are coupled with their respective coupling points, liquid can flow from port 140 through inner channel 806 to the inlet of the filter cartridge coupled with cartridge mating section 804.

FIG. 8B illustrates exemplary cartridge adapters 800a, 800b being used with their respective filter cartridges 810a, 810b. As shown and previously discussed, port 140 and threaded section 144 may be sized to be operably coupled with coupling element 154 of filter cartridge 152. In some cases, a user may desire to use device 100 with a different filter cartridge, such as filter cartridge 810a or filter cartridge 810b, for example. Accordingly, if the user desires to use device 100 with filter cartridge 810a, the user can use cartridge adapter 800a, which has a cartridge mating section 804a configured to couple with a liquid inlet of filter cartridge 810a, and threaded section 802 configured to couple with threaded section 144. Similarly, if the user desires to use device 100 with filter cartridge 810b, the user can use cartridge adapter 800b, which has a cartridge mating section 804b configured to couple with a liquid inlet of filter cartridge 810b, and threaded section 802 configured to couple with threaded section 144. Those with skill in the art will understand that FIG. 8B is provided as an illustrative example, and that the disclosure includes similar cartridge adapters compatible with any of a number of possible filter cartridges that could be used with device 100. Thus, with the addition of various cartridge adapters 800, device 100 can be considered universal in that it can be made to be compatible with virtually any filtride cartridge.

Figure 9:
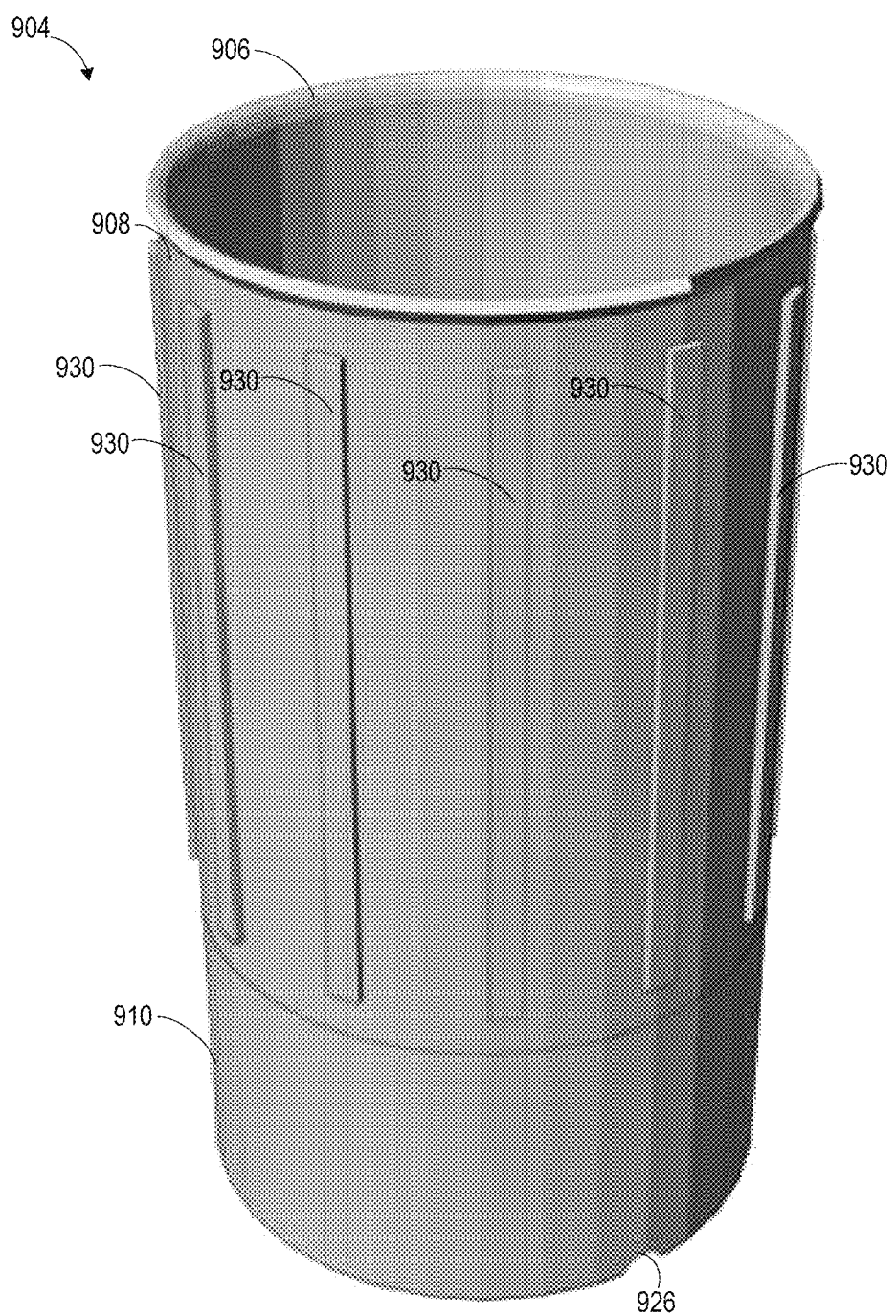
FIG. 9 illustrates a perspective view of another outer cup assembly including gripping features, according to another embodiment of this disclosure.

FIG. 9 illustrates a cup 904 according to another embodiment of this disclosure. As shown, cup 904 is substantially similar to cup 104 previously discussed, and can be used as part of device 100 in place of cup 104. As shown, cup 904 includes substantially the same components as cup 104, including a mouth 906 (substantially the same as mouth 106), a body 908 (substantially the same as body 108) removably coupled with a base 910 (substantially the same as base 110), and a handle groove 926 (substantially the same as handle groove 126), for example. In addition to these components, cup 904 further includes a plurality of grip features 930 disposed about an outer circumferential surface of cup 904. Specifically, in FIG. 9, grip features 930 are disposed on an outer circumferential surface of body 908; however, according to other embodiments, grip features 930 are additionally or alternatively disposed on the outer circumferential surface of base 910.

Grip features 930 protrude outward from the outer circumferential surface of cup 904 to provide friction such that a user can better grip cup 904 with their hand(s) when performing various actions with the cup, such as during plunging bottle 102 to filter liquid or in uncoupling/coupling body 908 and base 910. While grip features 930 are depicted as substantially vertically rectangular features, those with skill in the art will recognize that features 930 can comprise any shape for providing an ergonomic advantage in a user's hand gripping cup 904. While multiple grip features 930 are shown relatively evenly spaced about the outer circumferential surface of cup 904, those with skill in the art will recognize that various other embodiments fall within the scope of this disclosure. Grip features 930 can be spaced or positioned in any of various arrangements for providing an ergonomic advantage in a user's hand gripping cup 904. In some embodiments, grip features 930 can further provide structural stability for the cup 904, such as during plunging of bottle 102, for example.

Figure 10B:
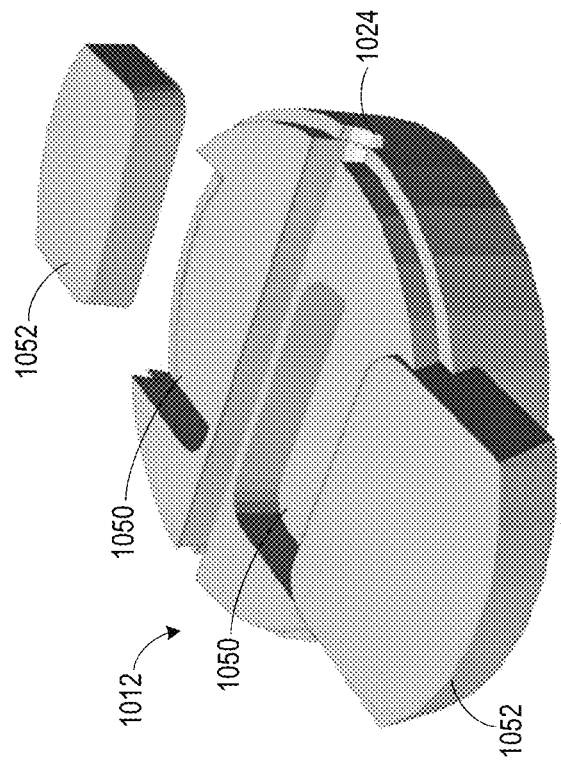
FIGS. 10A and 10B illustrate perspective views of a lid including items receptacles, according to another embodiment of this disclosure.
Figure 10A:
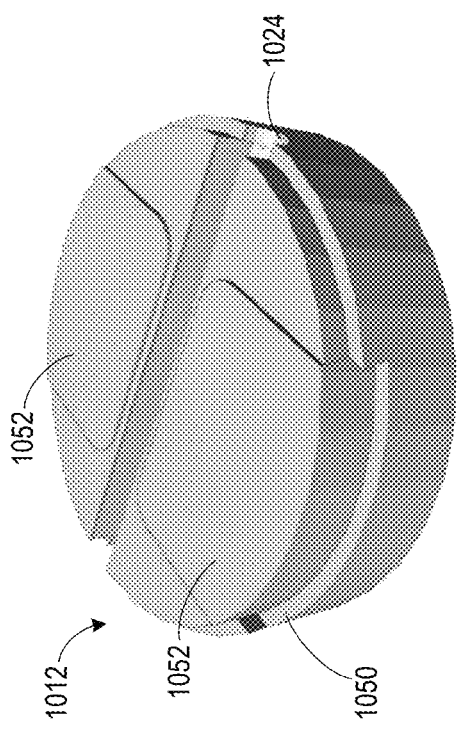

FIGS. 10A and 10B illustrate a lid 1012 according to another embodiment of this disclosure. As shown, lid 1012 is substantially similar to lid 112 previously discussed, and can be used a part of device 100 in place of lid 112. As shown, lid 1012 includes substantially the same components as lid 112, including a handle groove 1024 (substantially the same as handle groove 124) and is configured to be removably coupled with the top threaded section 134 of bottle body 114, for example. Lid 1012 further includes package receptacles 1050 each configured to carry a package 1052. As shown in FIG. 10B, according to some examples, packages 1052 are configured to be slidably inserted and removed from their respective package receptacle 1050. However, other insertion/removable methods are included as part of this disclosure, such as by snap-fitting or friction-fitting, for example.

Packages 1052 can be configured to be opened/closed so that a user can utilize packages 1052 for carrying any personal item that may fit within the package 1052. Packages 1052 could carry items useful for travel or outdoor activities where device 100 is being used. A purely illustrative and non-exhaustive list of example items that could be carried by packages 1052 includes: earphone devices; pills or medication; a small rechargeable light; an infrared beacon; an ultralight fishing kit; a fire starting kit; a signaling kit; condiments such as coffee, sugar, etc.; a sewing kit; small band-aide or splinter kits; water purification tablets; a rechargeable UV light purifier; a salt to chlorine electrolysis system; or a small compass, laser pointer, or other navigation device, for example.

Although package receptacles 1050 are generally rectangular in shape, package receptacles 1050 can comprise any shape and in some embodiments can be sized according to certain corresponding third-party packages or inserts. Additionally, in some examples, packages 1052 and/or lid 1012 can be comprised of a fluorescent or glow-in-the-dark material such that it is easier for a user to identity in low-light environments.

In some embodiments, lid 1012 is made of a transparent material and one or both packages 1052 includes an LED light (and associated power source) that points down into the interior of bottle 102. Thus, for low-light scenarios, the package 1052 can further include a user interface or external light sensor for activating the LED light, which shines into the interior of bottle 102. Therefore, due to lid 1012 being made of a transparent material, the user is able to see how much liquid is currently held by bottle 102 even in low-light or no-light environments, due to the LED light source.

Those with skill in the art will understand that various embodiments substantially similar to device 100 fall within the scope of this disclosure. For example, while device 100 is described as a portable or travel-sized model easily stowable in a backpack or camping bag and thus able to hold about 20-40 ounces of water, various other sizes water filtering devices fall within the scope of this disclosure. For example, in some embodiments, the devices are much larger and configured to store multiple cups or even gallons of water. For example, in some embodiments the outer cup may be as large as roughly the size of a 50-gallon drum or garbage can, or even larger. In these and other embodiments, there may be a plurality of the inlet water ports (analogous to port 140) in the associated inner bottle with a plurality of filtering cartridges attached instead of the single port 140 and cartridge 152 so that water can be filtered at a faster rate. Additionally, while elastic band assembly 118 has been described as being an energized component configured to plunge the bottle 102, those with skill in the art will recognize that various other similar components can be used in other embodiment; such as, for example, different elastic straps, cinching straps, ratcheting straps or devices, pulley systems, mechanical or pneumatic compression devices, winching devices, gravity-powered devices, and various other similar devices known in the art for serving similar purposes.

One of the many benefits of device 100 over various traditional devices is its ability to quickly produce a substantial quantity of filtered water with limited user interaction required. As previously discussed, many traditional filtering devices can only be operated by an able-bodied adult in order to move the natural water through the filter. Alternatively, device 100 is arranged such that people with compromised strength and/or dexterity (such as children, elderly, those with physical injuries or impairments, etc.) can easily apply the plunging force needed to filter the natural water by the use of an energized compression component, such as elastic band assembly 118.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A liquid filtration device, comprising:
   a cup assembly configured to carry an unfiltered liquid, the cup assembly including:
      a cup body with a top end open for receiving the unfiltered liquid and a bottom end, and
      a cup base configured to be removably coupled with the bottom end of the cup body;
   a bottle assembly configured to be plunged into the top end of the cup assembly in a plunging direction and seated within the cup assembly when fully plunged, the bottle assembly including:
      a port disposed on a bottom end of the bottle assembly and configured to communicate the unfiltered liquid carried by the cup assembly to an interior of the bottle assembly, and
      a filter cartridge coupled with the port, wherein, via the port, the unfiltered liquid is configured to pass through the filter cartridge as the bottle assembly is plunged in the plunging direction such that the filter cartridge filters the unfiltered liquid and discharges a filtered liquid in the interior of the bottle assembly; and
   a plunging-assist device configured to apply a compressive force to the bottle assembly and the cup assembly to plunge the bottle assembly in the cup assembly in the plunging direction and including a ring-shaped elastic band, a first handle disposed on a first end of the ring-shaped elastic band and configured to be seated in a corresponding bottle-handle-seat disposed on a top end of the bottle assembly, and a second handle disposed on a second end of the ring-shaped elastic band and configured to be seated in a corresponding cup-handle-seat disposed on the bottom end of the cup base,
   wherein, to extract the bottle assembly from the cup assembly, the cup base is configured to be uncoupled from the cup body and the bottle assembly is configured to be moved in the plunging direction past the bottom end of the cup body.

2. The liquid filtration device of claim 1, further comprising a seal disposed between an outer-facing surface of the bottle assembly and an inner-facing surface of the cup assembly to prevent the unfiltered liquid from escaping from the top end of the cup body when the bottle assembly is plunged into the cup assembly.

3. The liquid filtration device of claim 1, wherein the port extends from the bottom end of the bottle assembly into the interior of the bottle assembly and includes a threaded section on a distal end of the port to which the filter cartridge is configured to be removably coupled.

4. The liquid filtration device of claim 1, wherein the bottle assembly further comprises:
   a bottle body section; and
   a bottle base section removably coupled with a bottom end of the bottle body section,
   wherein the bottle base section includes the bottom end of the bottle assembly; and
   a lid removably coupled with a top end of the bottle body section.

5. The liquid filtration device of claim 4, wherein the bottle base section and the lid are each removably coupled with the bottle body section by a threaded connection.

6. The liquid filtration device of claim 1, wherein the cup base is removably coupled with the cup body by a threaded connection.

7. The liquid filtration device of claim 1, wherein the unfiltered liquid is unfiltered water from natural water source and the filter cartridge is configured to filter the unfiltered water to provide drinking-water safe for human consumption.

8. A liquid filtration device, comprising:
   a cup assembly configured to carry an unfiltered liquid, the cup assembly including:
      a cup body with a top end open for receiving the unfiltered liquid and a bottom end, and
      a cup base configured to be removably coupled with the bottom end of the cup body;
   a bottle assembly configured to be plunged into the top end of the cup assembly in a plunging direction and seated within the cup assembly when fully plunged, the bottle assembly including:
      a port disposed on a bottom end of the bottle assembly and configured to communicate the unfiltered liquid carried by the cup assembly to an interior of the bottle assembly, the port including a filter-attachment-section upon which a filter cartridge for filtering the unfiltered liquid communicated through the port is configured to be removably coupled; and
   a plunging-assist device configured to apply a compressive force to the bottle assembly and the cup assembly to plunge the bottle assembly in the cup assembly in the plunging direction and including a ring-shaped elastic band, a first handle disposed on a first end of the ring-shaped elastic band and configured to be seated in a corresponding bottle-handle-seat disposed on a top end of the bottle assembly, and a second handle disposed on a second end of the ring-shaped elastic band and configured to be seated in a corresponding cup-handle-seat disposed on the bottom end of the cup base,
   wherein, to extract the bottle assembly from the cup assembly, the cup base is configured to be uncoupled from the cup body and the bottle assembly is configured to be moved in the plunging direction past the bottom end of the cup body.

9. The liquid filtration device of claim 8, further comprising a seal disposed between an outer-facing surface of the bottle assembly and an inner-facing surface of the cup assembly to prevent the unfiltered liquid from escaping from the top end of the cup body when the bottle assembly is plunged into the cup assembly.

10. The liquid filtration device of claim 8, wherein the port extends from the bottom end of the bottle assembly into the interior of the bottle assembly and the filter-attachment-section comprises a threaded section on a distal end of the port to which the filter cartridge is configured to be removably coupled.

11. The liquid filtration device of claim 8, wherein the bottle assembly further comprises:
   a bottle body section; and
   a bottle base section removably coupled with a bottom end of the bottle body section,
   wherein the bottle base section includes the bottom end of the bottle assembly; and
   a lid removably coupled with a top end of the bottle body section.

12. The liquid filtration device of claim 11, wherein the bottle base section and the lid are each removably coupled with the bottle body section by a threaded connection.

13. The liquid filtration device of claim 8, wherein the cup base is removably coupled with the cup body by a threaded connection.

14. The liquid filtration device of claim 8, wherein the unfiltered liquid is unfiltered water from natural water source and the filter cartridge is configured to filter the unfiltered water to provide drinking-water safe for human consumption.

15. The liquid filtration device of claim 8, wherein the cup assembly further comprises a plurality of grip features disposed on an outer circumferential surface of the cup assembly and configured to assist a user in gripping the cup assembly.

* * * * *